United States Patent  [15] 3,636,839
Yamamoto  [45] Jan. 25, 1972

[54] ELECTRONIC SHUTTER CAMERAS WITH OCCLUDED LIGHT-MEASURING SYSTEMS

[72] Inventor: Masaru Yamamoto, Sagamihara, Japan
[73] Assignee: Yashica Company, Limited, Tokyo, Japan
[22] Filed: Aug. 21, 1970
[21] Appl. No.: 65,847

[30] Foreign Application Priority Data
Aug. 27, 1969 Japan..................................44/67181

[52] U.S. Cl..............................95/10 CT, 95/42, 95/53 E
[51] Int. Cl........................................G03b 7/08, G03b 9/62
[58] Field of Search.................95/10 C, 10 CE, 10 CT, 42, 95/53 E

[56] References Cited

UNITED STATES PATENTS 3,442,190  5/1969  Erickson..............................95/10 CT
3,470,798  10/1969  Miyakawa...........................95/10 CT
3,503,313  3/1970  Kuramoto............................95/10 CT
3,533,348  10/1970  Yanagi..................................95/42 X Primary Examiner—Joseph F. Peters
Attorney—Chittick, Pfund, Birch, Samuels & Gauthier

[57] ABSTRACT

In an electronic shutter camera of the type wherein the light quantity transmitted through the objective lens of the camera is measured by an occluded photoelectric transducer element and stored in a memory device and a shutter-operating circuit responsive to the output from the memory device is used to determine the shutter time, there are provided a second photoelectric transducer positioned to receive light reflected by an object illuminated by a flashlamp or a stroboscope, and a transfer switch for transferring the shutter-operating circuit between the memory device and the second photoelectric transducer element when a flashlamp or stroboscope is mounted on the camera.

2 Claims, 1 Drawing Figure

PATENTED JAN 25 1972
3,636,839
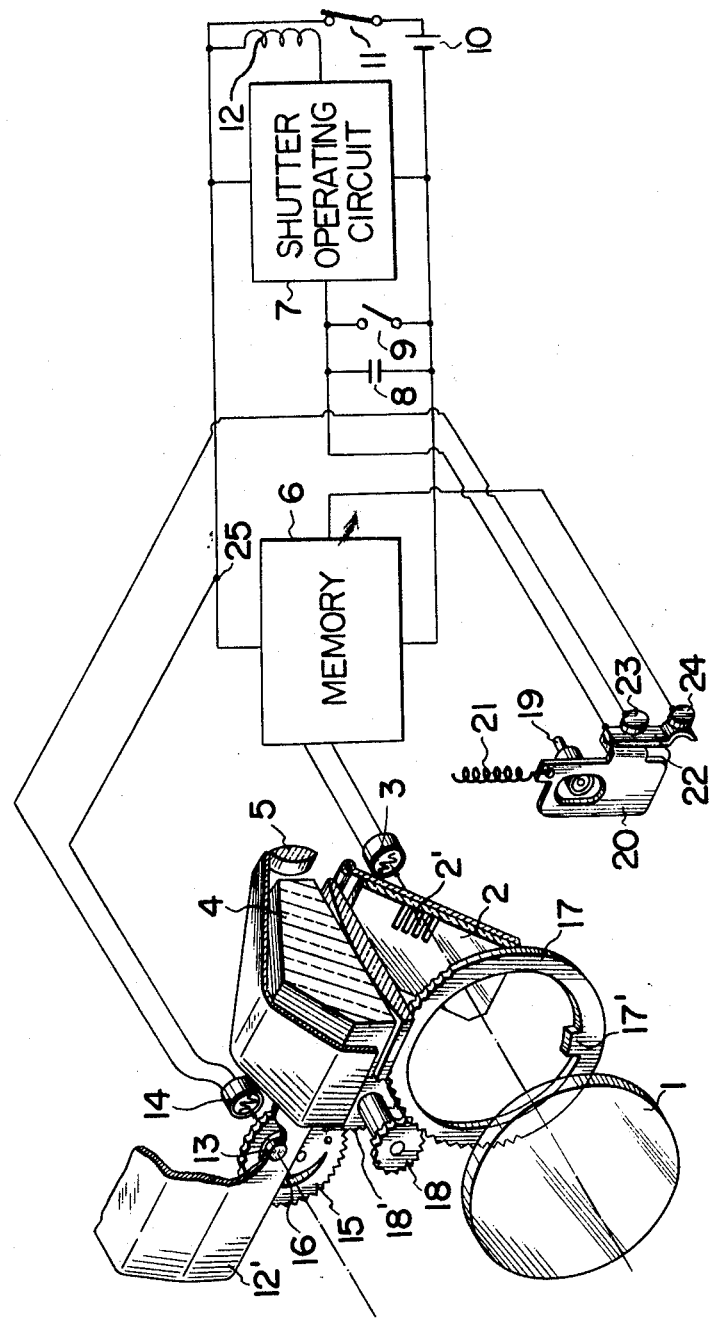
INVENTOR
MASARU YAMAMOTO
BY
Chittick, Pfund, Birch, Samuels & Gauthier
ATTORNEY

BEAM MOTION COMPENSATION IN OPTICAL IMAGE TRANSFER SYSTEMS HAVING MOVING PARTS

BACKGROUND OF THE INVENTION

1. Field of the Invention

The invention relates to elimination of a cause of image smearing and other improvements in optical image transfer apparatus having moving elements in the light transfer path. According to one aspect of the invention mechanically produced long deflections of a beam of light relative to a sensitive surface, in particular deflections of a laser beam relative to unexposed film in a photographic printer, are converted into a series of intermittent short deflections coordinated in timing with image segment (i.e., character image) exposure intervals. The short deflections are controlled by electrical means without inertia, and serve to reduce, or eliminate entirely, motion of the beam relative to the sensitive surface during segment exposure intervals. Consequently, sharper and more intense images are formed at the surface. In another aspect the invention is used to compensate electrically for short-term motion of a holographic medium relative to a light beam which is modulated by the holograms in the medium.

2. Description of the Prior Art

Optical systems for transporting images in discrete segments by means of rotating mirrors or other moving parts arranged in the light transfer path have been exhaustively treated in patents and other published literature. The following references are cited as representative of this treatment:

a. Proceedings of the IEEE, Vol. 54, No. 10, Oct. 1966, pp. 1,429–1437. "A Television Display Using Acoustic Deflection and Modulation of Coherent Light," A. Korpel et al.

b. Ibid, pp. 1,437–1,444, "A Survey of Laser Beam Deflection Techniques." V. J. Fowler et al.

c. IEEE Spectrum Feb. 1968, pp. 45–52, "Electro-Optic Light Beam Deflection," J. F. Lotspeich.

d. U.S. Pat. No. 3,154,371, W. R. Johnson.

e. U.S. Pat. No. 3,360,659, C. J. T. Young.

It is our understanding that distortion of optically transferred image segments due to motion in the optical transfer system is usually controlled in such systems by reducing the segment exposure intervals (i.e., reducing shutter opening time) and increasing the energy output of the light source. This however is inefficient and in many instances unacceptable because it imposes unreasonable power demands on the source, and does not eliminate the smearing. Varying the motion of the moving element is unsatisfactory in most systems because of inertial limitations.

The present invention seeks to overcome the foregoing problems without creating new ones. Such objects are achieved by utilizing electrically controlled short displacements of the beam to compensate for the motion of the optics or other moving parts during image segment transfers. By controlling the compensating beam displacements electrically and coordinating such control with the relatively long-term motion of the moving parts of the system image smearing and contrast loss effects are significantly reduced without substantial added dissipation of light energy. Because of these advantages the invention, in effect, permits expansion of the segment exposure intervals in appropriate circumstances whereby image contrast may be enhanced.

Thus, in specific applications described herein—including apparatus for performing nonimpact printing at high speeds by sequential character photography and apparatus for reading discrete hologram records at high speeds—the invention provides a basis for achieving otherwise unattainable image exposure periods and image transfer fidelity from a moderately intense light source in a system with moving parts.

SUMMARY OF THE INVENTION

The invention involves electro-optic compensation for relative motion between a light beam and a moving medium during periods in which a segment of an image formed by the light beam is being transferred relative to the medium. This enhances the definition and contrast of the transferred image and also enables more effective use to be made of the light source energy. In one application motion between a moving reflector and a sensitive device or surface receiving the reflected beam is cancelled during image segment exposure intervals, thereby reducing image smearing and permitting lengthening of image segment exposure intervals. Cancellation is accomplished by short electrical displacements of the beam with, for example, an electro-optic cell. The object of this, as we have indicated previously is to project intensified, more clearly defined and undistorted images with a light source of moderate intensity. This has particular advantage in specific applications; as an example in resolving and intensifying the necessarily brief exposures of a photographic recording medium to the segments of a segmented image formed by a laser beam in a high-speed nonimpact printing process.

In another application disclosed herein the motion of a light beam in relation to a moving medium containing a hologram record is modified by electro-optic means, whereby the light impinging on discrete elements of the moving record is momentarily deflected in order to track the motion of the individual image elements and thereby provide for more accurate detection of the elements.

In both applications above the compensating beam deflections are coordinated with the intervals of beam exposure in such fashion that apparent motion during periods of image exposure between the exposed beam and a particular surface in the beam path is either nullified or significantly reduced. By restricting the compensating deflections to small amplitude excursions the electro-optic means utilized for the purpose introduces minimal light and electrical energy losses into the system in furtherance of the objective of efficiently delivering maximal light energy to the sensitive surface on which the beam finally impinges.

This sensitive surface may, for example, contain a light-sensitive recording medium by which it is desired to produce a high-speed photographic record of an image exposed in segments by the beam and a moving reflector. By enhancing concentration of light energy at the recording medium during individual segment exposures the invention serves to reduce the power required from the light source, and/or to reduce the time required to complete a full image exposure, for little additional cost over a straightforward system utilizing an uncompensated moving reflector.

The foregoing and other features, objects and advantages of the invention will be apparent from the following more particular description of preferred embodiments of the invention as illustrated in the accompanying drawings.

BRIEF DESCRIPTION OF THE DRAWINGS

FIG. 1 is a schematic illustration of one optical system embodying the invention;

FIGS. 2–6 are waveform diagrams for explaining various aspects of operation of a system such as that shown in FIG. 1;

FIGS. 7–10 illustrate the appearance of a single character image projected by the system of FIG. 1 and effects thereon resulting from short counterdeflections of the laser beam and variations in the shutter opening period;

FIG. 11 is a schematic illustrating a second system embodiment of the invention.

DETAILED DESCRIPTION OF PREFERRED EMBODIMENTS

In FIG. 1 a laser source 1 of conventional construction provides a collimated beam of laser light. Position controls 2a, 2b operated by character selection signals supplied from source 2c direct the laser beam through a character image forming mask 3. The masked beam is repositioned by controls 2b and then applied to an electro-optic shutter device 4, also of well-known construction.

In this manner according to this invention, at the time of photographing with a flashlamp or a stroboscope correct light exposure can be assured corresponding to the quantity of light reflected form an object.

While the invention has been shown and described in terms of a preferred embodiment thereof, it should be understood that many changes and modifications will be obvious to one skilled in the art without departing from the true spirit and scope of the invention as defined in the appended claims.

What is claimed is:

1. In an electronic shutter camera with an occluded light-measuring system comprising a photoelectric transducer element for measuring a quantity of light transmitted through an objective lens of the camera, memory means to store the light quantity measured by said photoelectric transducer element, and a shutter-operating circuit responsive to the output from said memory means for determining the shutter time, the improvement which comprises a second photoelectric transducer element, means to project light reflected by an object illuminated by a flashlamp or stroboscope upon said second photoelectric transducer element, and means responsive to the mounting of said flashlamp or stroboscope on the camera body to switch the connection of said shutter operating circuit between said memory means and said second photoelectric transducer.

2. The electronic shutter camera according to claim 1 which further comprises a first iris diaphragm associated with said objective lens and a second iris diaphragm associated with said second photoelectric transducer element and means to interlock said first and second iris diaphragms.

* * * * *